(12) United States Patent
Qian

(10) Patent No.: US 9,087,108 B2
(45) Date of Patent: *Jul. 21, 2015

(54) DETERMINATION OF CATEGORY INFORMATION USING MULTIPLE STAGES

(71) Applicant: Alibaba Group Holding Limited, George Town, KY (US)

(72) Inventor: Jianping Qian, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/037,247

(22) Filed: Sep. 25, 2013

(65) Prior Publication Data

US 2014/0074831 A1    Mar. 13, 2014

Related U.S. Application Data

(63) Continuation of application No. 13/317,789, filed on Oct. 27, 2011, now Pat. No. 8,583,685.

(30) Foreign Application Priority Data

Nov. 2, 2010   (CN) .......................... 2010 1 0530231

(51) Int. Cl.
  *G06F 17/30* (2006.01)
  *G06Q 30/06* (2012.01)

(52) U.S. Cl.
  CPC ...... *G06F 17/3053* (2013.01); *G06F 17/30864* (2013.01); *G06Q 30/0601* (2013.01)

(58) Field of Classification Search
  None
  See application file for complete search history.

(56) References Cited

U.S. PATENT DOCUMENTS

| | | | | |
|---|---|---|---|---|
| 7,792,858 B2 * | 9/2010 | Tang et al. | ..................... | 707/780 |
| 7,801,889 B2 * | 9/2010 | Kim et al. | ..................... | 707/731 |
| 7,996,393 B1 * | 8/2011 | Nanno et al. | ................... | 707/723 |
| 8,131,722 B2 * | 3/2012 | Sundaresan et al. | .......... | 707/737 |
| 8,244,752 B2 * | 8/2012 | Buehrer et al. | ............... | 707/769 |
| 2005/0222987 A1 * | 10/2005 | Vadon | ................................ | 707/3 |
| 2011/0314006 A1 * | 12/2011 | Sweeney et al. | .............. | 707/723 |

FOREIGN PATENT DOCUMENTS

| | | |
|---|---|---|
| CN | 1512402 | 7/2004 |
| CN | 101593200 | 12/2009 |

OTHER PUBLICATIONS

Shen et al. "Building bridges for web query classification." Proceedings of the 29th annual international ACM SIGIR conference on Research and development in information retrieval. ACM, 2006.

Zhu et al. "Query classification using asymmetric learning." Applications of Digital Information and Web Technologies, 2009. ICADIWT'09. Second International Conference on the. IEEE, 2009.

He et al. "Regularized query classification using search click information." Pattern Recognition 41.7 (2008): 2283-2288.

* cited by examiner

*Primary Examiner* — Sherief Badawi
*Assistant Examiner* — Christopher J Raab
(74) *Attorney, Agent, or Firm* — Van Pelt, Yi & James LLP

(57) ABSTRACT

Providing category information includes: receiving a plurality of search key word sets that were previously input by a plurality of users; obtaining category information corresponding to the plurality of search key word sets; segmenting each of the plurality of search key word sets into search key word units; combining the search key word units into a plurality of search key word unit groups that correspond to a plurality of stages; based at least in part on the category information, determining category information that specifically corresponds to the plurality of search key word unit groups; and based at least in part on category information, establishing a plurality of search key word tables corresponding to the plurality of stages.

18 Claims, 8 Drawing Sheets

DETERMINATION OF CATEGORY INFORMATION USING MULTIPLE STAGES

CROSS REFERENCE TO OTHER APPLICATIONS

This application is a continuation of co-pending U.S. patent application Ser. No. 13/317,789, entitled DETERMINATION OF CATEGORY INFORMATION USING MULTIPLE STAGES filed Oct. 27, 2011 which is incorporated herein by reference for all purposes, which claims priority to People's Republic of China Patent Application No. 201010530231.5 entitled A DEVICE AND METHOD FOR PROVIDING CATEGORY INFORMATION filed Nov. 2, 2010 which is incorporated herein by reference for all purposes.

FIELD OF THE INVENTION

The present application relates to the field of information processing technology. In particular, it relates to provision of category information.

BACKGROUND OF THE INVENTION

E-commerce websites provide users with merchandise information for merchandise bought or sold online. A user typically searches for the relevant merchandise on the e-commerce website by inputting search key words. The e-commerce website, in accordance with search key words input by the user, outputs links to the relevant merchandise pages for the user, and recommends reasonable categories for the user so that the user can easily find the merchandise that he needs among the merchandise included in the user-selected categories. The guided search tends to be more efficient for the user.

In the prior art, category information provided to the user can be provided through real-time queries. FIG. 1 is a flow chart illustrating an example process used by existing systems to provide category information.

Step 11: user-input key word sets are received. As an example, a key word set input by the user is "solid color hat."

Step 12: Look up the merchandise identifiers containing these key words among the merchandise identifiers for all merchandise. As an example, it is assumed that a total of 508 merchandise identifiers containing the keywords "solid color hat" were found.

Step 13: determine different category information corresponding to the merchandise identifiers. If the category information corresponding to the 508 merchandise identifiers includes "Hat" and "Women's Apparel," then the determined category information includes "Hat" and "Women's Apparel." Such category information may be preconfigured. For example, the seller may set the category information for certain merchandise at the time the seller configures the merchandise for sale on the given website.

Step 14: determine the quantity of merchandise identifiers, among the merchandise identifiers that were found, corresponding to each piece of determined category information. If, for example, the category information for 192 of the 508 merchandise identifiers that were found is "Hat," and "Women's Apparel" is found for the other 316 merchandise identifiers, then the determined quantity for the category information "Hat" will be 192 and the determined quantity for the category information "Women's Apparel" will be 316.

Step 15: provide the user with each piece of category information that has been determined together with the corresponding determined quantity. For example, the user is provided with "Hat" (192) and "Women's Apparel" (316).

However, in the method described above, the e-commerce website needs to conduct merchandise identifier searches and determine category information in real-time based on the key words input by the user. The technique will consume a lot of processing resources and processing efficiency will be lower.

To address the problem described above, some systems use a form of reference word table. FIG. 2 is a flowchart illustrating an example process for providing category information that uses reference word table.

Step 21: when a user clicks on a merchandise link in the list of search results, the current key words input by the user and the category information for that merchandise are stored.

Step 22: perform a simple gathering procedure on the stored key words and category information, and determine the key words whose search frequency within a specified period of time are higher than that of a specified threshold value. For example, this step determines which key words have more than 30 searches during one week.

Step 23: form a word reference table from the correspondence that was determined between the key words and the category information. In this table, each key word corresponds to at least one piece of category information.

Step 24: when a user subsequently inputs key words to search for merchandise, look up, based on the key words input by the user, the category information corresponding to the key words input by the user in the stored reference word table.

Step 25: provide the located category information to the user.

In the above process, when providing the user with category information based on a reference word table, the reference word table contains only the correspondences between category information and key words with higher user search frequencies. Key words that have lower user search frequencies are referred to as low-frequency search key words or long-tail key words. Since the reference word table does not store long-tail key words and their corresponding category information, it is difficult to respond with pertinent category information when the key word input by a user is a long-tail key word.

BRIEF DESCRIPTION OF THE DRAWINGS

Various embodiments of the invention are disclosed in the following detailed description and the accompanying drawings.

DETAILED DESCRIPTION

Figure 1:
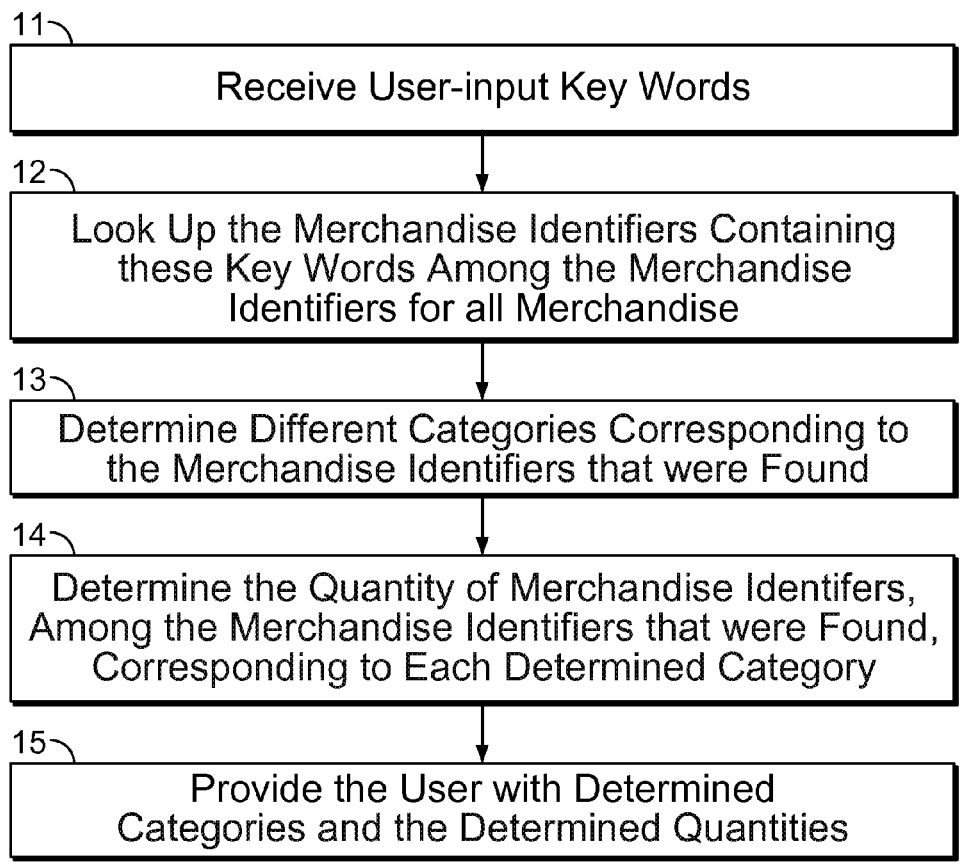
FIG. 1 is a flow chart of the method in the prior art for providing category information to users through real-time queries.
Figure 2:
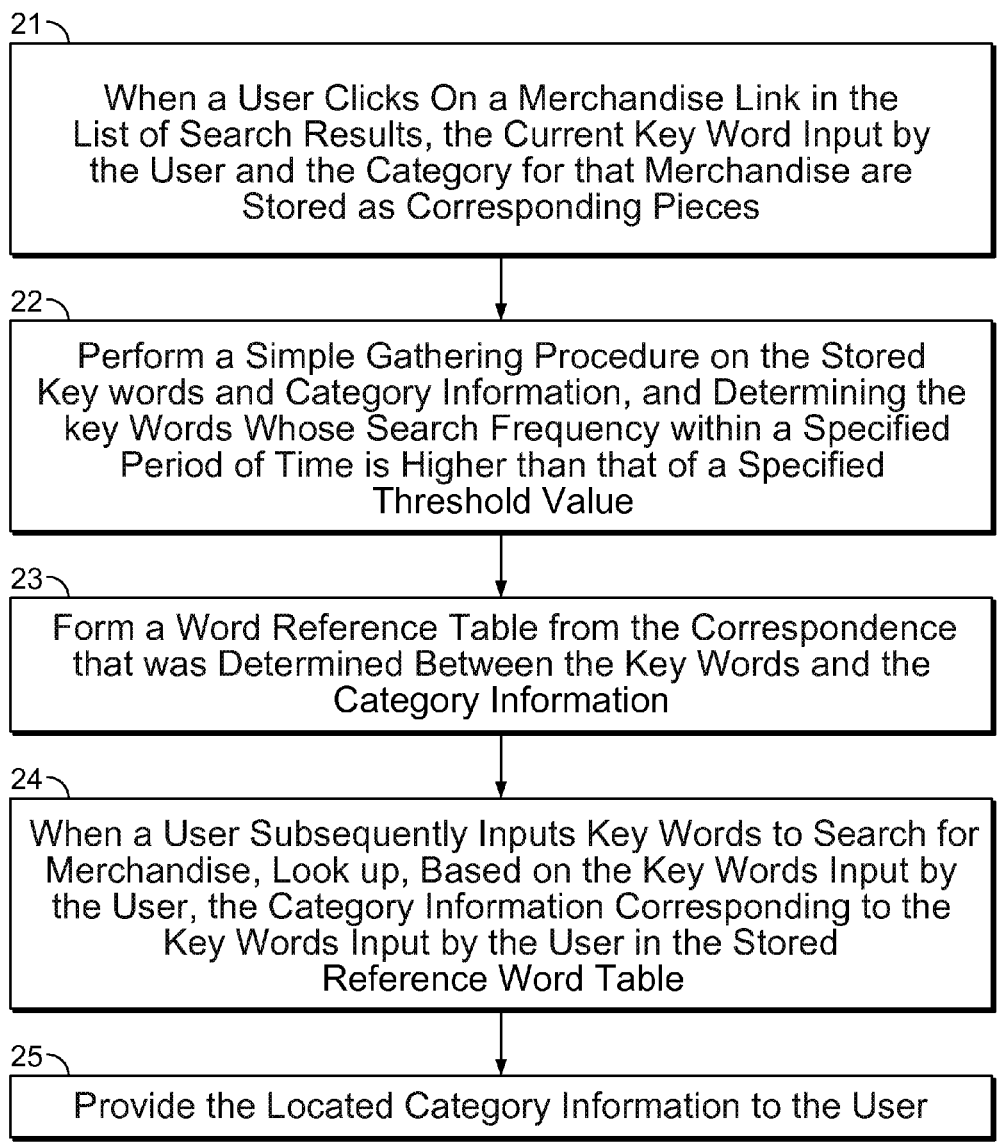
FIG. 2 is a flow chart of the method in the prior art for providing category information to users through reference word tables.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing category information is disclosed. The technique may be used by e-commerce platforms to provide category information of merchandise in response to users' search query. In some embodiments, the technique includes receiving a plurality of search key word sets that were previously input by a plurality of users; obtaining category information corresponding to the plurality of search key word sets, the category information being determined based at least in part on the plurality of users' selections; segmenting each of the plurality of search key word sets into search key word units; combining the search key word units into a plurality of search key word unit groups that correspond to a plurality of stages, the search key word unit groups corresponding to the same stage having the same number of search key word units; based at least in part on the category information corresponding to the plurality of search key word sets, determining category information that specifically corresponds to the plurality of search key word unit groups; and based at least in part on category information specifically corresponding to the plurality of search key word unit groups, establishing a plurality of search key word tables corresponding to the plurality of stages, each stage having a corresponding search key word table that comprises the correspondence between the search key word unit groups for said each stage and the category information that specifically corresponds to the plurality of search key word unit groups. The plurality of search key word tables are used to provide current category information of a current search key word set input by a user.

Figure 3:
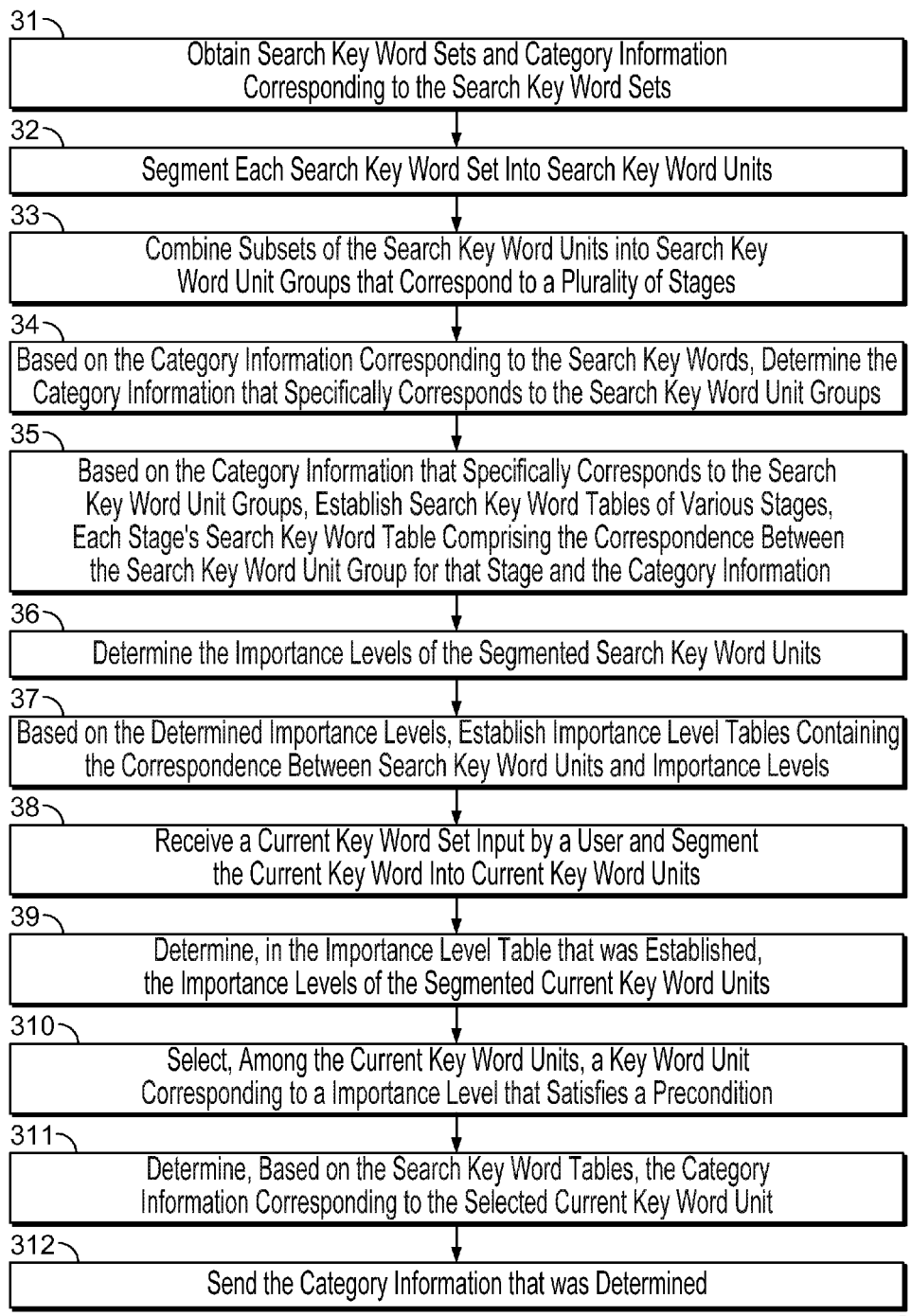
FIG. 3 is a flow chart illustrating an embodiment of a process for providing category information.

FIG. 3 is a flowchart illustrating an embodiment of a process for providing category information. The process may be performed on a system such as 500 described below.

At 31, search key word sets that are input by users during a period of time and the category information corresponding to the sets of search key words are obtained.

In some embodiments, the category information is determined based on user selection, in particular user selection of responses to the search keyword sets. In this example, the browser provides the user with an interface for inputting search key words to an e-commerce website. After a user inputs a set of search key words through the browser, the server returns a list of search results in response, which are displayed in the user's browser. The displayed list of search results includes links to various types of merchandise found on the basis of the search key words input by the user. If the user clicks on (selects) one of the links in the list of search results, then the browser will record this click action by the user in a selection log and send it to a log server. Each selection log includes search key words input by the user, the category information (e.g., names or identifiers of the categories entered by the seller) corresponding to the selected merchandise, and a user identifier. In this case, a user is equivalent to an e-commerce website visitor; thus, the user identifier is also the visitor identifier. An example format of the selection log is shown below:

| Search key word set | Category corresponding to the selected merchandise | Visitor identifier |
|---|---|---|
| Solid-color long sleeve shirt | Men's Fashion Apparel | 001 |

A search key word set may also correspond to two or more categories, in which case the format of the selection log can be, but is not limited to, what is shown below:

| Search key word set | Category corresponding to the selected merchandise | Visitor identifier |
|---|---|---|
| Solid-color long sleeve shirt | Men's Fashion Apparel Women's Fashion Apparel | 001 |

In some embodiments, the selection log is obtained from the log server at fixed intervals. This fixed interval can, but is not limited to, one day, one week, one month, etc. It is therefore possible to obtain the category information corresponding to the search key words for the corresponding time interval.

In some embodiments, an upload log instead of a selection log is used. An upload log contains seller-uploaded merchandise identifiers, category information for the merchandise, and merchant identifiers. The merchandise identifier uploaded by the merchant is processed in the same way as search key words in a selection log, and the merchant identifier is processed in the same way as a visitor identifier in a selection log.

At 32, each set of search key words is segmented into search key word units. In some embodiments, the search key word units are the smallest word combinations that express semantic meaning.

In some embodiments, the system analyzes every selection log after the selection logs are obtained. First, the search key words in the selection logs are subject to normalization. Normalization includes, for example, elimination of unnecessary words and extra spaces (conversions between upper and lower cases, between full and half-size characters, and between simplified and traditional characters); elimination of punctuation marks; conversion of numerical formats, and so on. After normalization is completed, each search key word set is segmented into search key word units. In languages, such as English, that include a word delimiter (e.g., the space), the search key word units may be words found by using the delimiter. In languages such as Chinese where no word delimiter is used, statistical segmentation techniques may be used. In some techniques, a corpus is used. The search key words are matched against each segmentation word in the corpus, and the matched segmentation words are confirmed as segmented search key word units. For example, after the received search key words "solid-color long sleeve shirt" is segmented, the resulting search key word units are "solid-color," "long sleeve," and "shirt."

In this example, after the search key words have been segmented into search key word units, the search key word units are optionally sequenced. The result is sequenced search key word units. Sequencing can be done according to alphabetical order (e.g., for English or Chinese pinyin (Romanization system)) or stroke order (e.g., for Chinese or Japanese). Sequencing can reduce the size of the search key word table that is ultimately formed and to establish processing steps for the search key word table. For example, the results of search key word unit segmentation performed on the search key words "long sleeve solid-color shirt" and "long sleeve shirt solid-color" are "long sleeve," "solid-color," and "shirt"; the sequenced search key word units in both cases are "long sleeve^shirt^solid-color." Consequently, only the sequenced search key words "long sleeve^shirt^solid-color" needs to be processed.

At 33, the search key word units segmented from each set of search key words are combined into search key word unit groups that correspond to a number of stages. Each stage corresponds to a set of search key word unit groups that have the same number of search key word units for each group member.

In this example, the system presets a specified quantity N, wherein N≥1, and establishes search key word tables from stage 1 to stage N. When each set of search key words is segmented into search key word units, the number of segmented search key word units is indicated as P. If P>N, then search key word unit groups of stages 1 through N may be formed. If P≤N, then search key word unit groups of stages 1 through P may be formed. The number of search key word units included in each search key word unit group is the same as the stage number.

The following example illustrates how stage 1, stage 2, and stage 3 search key word unit groups are formed. To form stage 1 search key word unit groups, each search key word unit in each sequenced search key word is directly included in the stage 1 search key word unit group. For example, search key word units segmented from "long sleeve solid-color shirt" and "long sleeve shirt solid-color" are "long sleeve," "shirt," "solid-color" in both cases. In other words, the corresponding sequenced search key words are "long sleeve^shirt^solid-color," in which case the stage 1 search key word unit group includes "long sleeve," "shirt," and "solid-color."

To form stage 2 search key word unit groups, every two search key word units from each sequenced search key word are combined to form stage 2 search key word unit groups. Using the same example described above, if the sequenced search key words are "long sleeve^shirt^solid-color," pairs of keyword units are combined to obtain stage 2 search key word unit groups of "long sleeve^shirt," "long sleeve^solid-color," and "shirt^solid-color."

To form stage 3 search key word unit groups, every three search key word units from each sequenced search key word are combined to form stage 3 search key word unit groups. For example, search key word units segmented from "long sleeve solid-color fashion shirt" and "long sleeve shirt solid-color fashion" are in both cases "long sleeve," "shirt," "fashion," and "solid-color." In other words, the corresponding sequenced search key word is "long sleeve^shirt^solid-color-^fashion." From these four search key word units, four stage 3 search key word unit groups are formed: "long sleeve^shirt-^solid-color," "long sleeve^shirt^fashion," "long sleeve^solid-color^fashion," and "shirt^solid-color^fashion."

Similar techniques are applied to form stage N search keyword unit groups.

In this example, after the search key word unit groups of various stages have been formed, the search key word units in each search key word unit group are optionally sequenced according to alphabetical or stroke order. The result is sequenced search key word unit groups. For example, the search key word units in the sequenced search key words "long sleeve solid-color shirt" can be combined into three stage 2 search key word unit groups: "long sleeve^shirt," "long sleeve^solid-color," and "shirt^solid-color." Sequencing can reduce the size of the search key word table that is ultimately formed to reduce the processing steps entailed in establishing the search key word table. For example, after the stage 2 search key word unit groups "long sleeve^shirt" and "shirt^long sleeve" are sequenced, the resulting stage 2 search key word unit groups are both "long sleeve^shirt." In subsequent steps, only the sequenced search key word unit group "long sleeve^shirt" needs to be processed.

At 34, based at least in part on category information corresponding to the obtained search key words, determine the category information specifically corresponding to the search key word unit groups that were formed.

When determining the category information corresponding to the search key word unit groups, the system can identify the category corresponding to the search key words that include the search key word units in the search key word unit groups, and associate the identified category with the search key word unit groups. As an example, assume that the search key words that include the stage 2 search key word unit group "long sleeve^shirt" are "long sleeve solid-color shirt," "long sleeve shirt solid-color," and "women's long sleeve shirt." The categories corresponding to "long sleeve solid-color shirt" and "long sleeve shirt solid-color" are "Men's Fashion Apparel" and "Women's Fashion Apparel." The category corresponding to "women's long sleeve shirt" is "Women's Fashion Apparel." The information is shown in the table below:

| Search key word unit group | Associated search key word | Category |
|---|---|---|
| Long sleeve^shirt | Long sleeve solid-color shirt | Men's Fashion Apparel |
| | | Women's Fashion Apparel |
| | Long sleeve shirt solid-color | Men's Fashion Apparel |
| | | Women's Fashion Apparel |
| | women's long sleeve shirt | Women's Fashion Apparel |

Therefore, the categories corresponding to the stage 2 search key word unit group "long-sleeve^shirt" are "Men's Fashion Apparel" and "Women's Fashion Apparel."

At 35, based on the category information that was determined (i.e., the category information that specifically corresponds to the search key word unit groups), search key word tables of the various stages are established. The search key word table of each stage comprises the correspondence between the search key word unit groups for that stage and the category information for the search key word unit groups. In particular, if the preset specified number of stages is N, then search key word tables are established for stage 1 through N.

At 36, the importance level of each search key word unit is determined.

In this example, the importance level of each search key word unit is predetermined, and an importance level table is established. Then, after segmenting the obtained current key words into current key word units, the importance levels of the current key words units in the established importance level table are directly determined.

Figure 4:
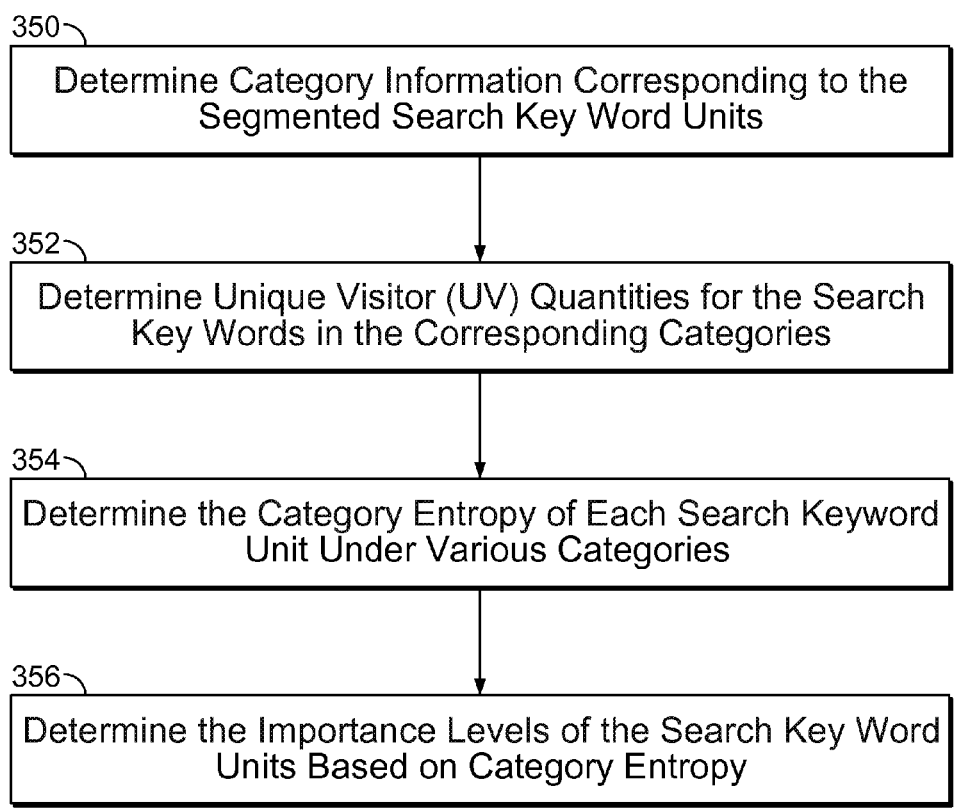
FIG. 4 is a flow chart illustrating an embodiment of a process for determining the importance level of each search key word unit.

FIG. 4 is a flowchart illustrating an embodiment of a process for determining the importance level of each search key word unit. Other processes may be used.

At 350, based on the category information corresponding to the search key word sets, determine the category information (e.g., names and/or identifiers of categories) specifically corresponding to the segmented search key word units. The categories specifically corresponding to the search key words associated with each search key word unit are the categories corresponding to that search key word unit. For example, let us assume that there are two sets of search key words from which the search key word unit "solid-color" is derived, namely "solid-color hat" and "solid-color long sleeve shirt," and that the categories corresponding to the search key word "solid-color hat" is "Women's Fashion Apparel" and "Hats", and that the categories corresponding to the search key word "solid-color long sleeve shirt" are "Men's Fashion Apparel" and "Women's Fashion Apparel." Thus, the categories for the search key word unit "solid-color" are "Women's Fashion Apparel," "Hats," and "Men's Fashion Apparel," as shown in the table below:

| Search key word unit | Associated search key word | Category |
| --- | --- | --- |
| solid-color | solid-color hat | Hats |
| | | Women's Fashion Apparel |
| | solid-color long sleeve shirt | Men's Fashion Apparel |
| | | Women's Fashion Apparel |

At 352, based on the visitor identifiers in the selection log, determine the unique visitor (UV) quantities for the search key word units under the corresponding categories. The UV quantity is the number of visits of the web page based on the visitor identifiers, after redundancies (e.g., repeated visits by users with the same visitor identifiers) have been removed. The sum of UV quantities under all categories for the search key words associated with each search key word unit is the UV quantity for that search key word unit under those categories. For example, let us assume that the UV quantities of "solid-color hat" under the categories of "Women's Fashion Apparel" and "Hats" are 205 and 300, respectively, and the UV quantities of "solid-color long sleeve shirt" under the categories of "Women's Fashion Apparel" and "Men's Fashion Apparel" are 459 and 902, respectively. In this case, the UV quantity for the search key word unit "solid-color" under the category of "Women's Fashion Apparel" is 205+459=664, its UV quantity under the category of "Hats" is 300, and its UV quantity under the category of "Men's Fashion Apparel" is 902, as illustrated in the table below:

| Search key word unit | Associated search key word | Category | UV quantity of search key words under the category |
| --- | --- | --- | --- |
| solid-color | solid-color hat | Hats | 300 |
| | | Women's Fashion Apparel | 205 |
| | solid-color long sleeve shirt | Men's Fashion Apparel | 902 |
| | | Women's Fashion Apparel | 459 |

In some embodiments, optionally and in accordance with a preset rule, the search key word units segmented from each search key word are sequenced, resulting in categories corresponding to sequenced search key words and UV quantities under the corresponding categories. The UV quantities for the search key word units under the categories are determined.

In 354, based on the determined UV quantities, the category entropy of each search key word unit under the various categories is determined.

In some embodiments, the category entropy of the search key word units under the various categories can be determined through the formula below:

$$H_i = \sum_{j=1}^{K} \left( -\frac{P_{ij}}{P_i} \log_2 \frac{P_{ij}}{P_i} \right)$$

wherein, is the category entropy of the search key word unit i; K is the quantity of categories where UVs for the search key word unit i are present; $P_{ij}$ is the UV quantity for the search key word unit i under the $j^{th}$ category; $P_i$ is the UV quantity for the search key word unit i under all categories, which is to say the sum of UV quantities under all categories.

At 356, based on the determined category entropy, the importance level of each search key word unit is determined based at least in part on the category entropy.

In some embodiments, the importance levels can be determined by taking the reciprocal of the category entropy, although other appropriate techniques may be applied. That is, if the category entropy of the search key word unit i is $H_i$ and the importance level is $Z_i$, then $$Z_i = \frac{1}{H_i}.$$

The relationship between the importance level and category entropy is not limited to a reciprocal relationship, although the category entropy should be inversely related to the importance level; in other words, the higher the category entropy, the lower the importance and vice versa.

Returning to FIG. 3, at 37, based on the determined importance levels, importance level tables containing the correspondence between search key word units and importance levels are established.

After determining the importance levels of the search key word units, the search key word units and the determined importance levels may be stored in an importance level table.

In some embodiments, in addition to or instead of determining importance levels of search key word units based on category entropy, the term frequency-inverse document frequency (TF-IDF) method is optionally used to determine the importance levels of search key word units. The technique involves the following steps:

First, the term frequency of the search key word units is calculated. This includes: based on the obtained selection log, determining the search key words corresponding to each piece of category information that has been determined; segmenting each search key word into search key word units; and determining the term frequency of each search key word unit among all search key word units.

Next, the document frequency of each search key word unit is calculated.

Next, the weighted TF-IDF value of the search key word unit is calculated. For each search key word unit, the calculated term frequency by the document frequency is divided to obtain the weighted TF-IDF value of that search key word unit.

Finally, based on the calculated weighted TF-IDF value, the importance level of each search key word unit is determined, wherein the weighted TF-IDF value is positively related to the importance level. That is, the larger the weighted TF-IDF value, the larger the importance level will be; the smaller the weighted TF-IDF value, the smaller the importance level will be.

At 38, after the current set of key words entered by the user is received, the current set of key words is segmented into current key word units.

When a user needs to search for merchandise information, he or she inputs a current set of key words via a browser. Once the current set of key words is received by the server, the key words are normalized. After normalization is completed, the correspondences between the key words and the category information are stored in a reference word table, and the category information corresponding to the current key word is looked up. If a category can be located, then the current set of key words is confirmed as a non-long-tail key word set. At this point, the located category information is directly provided to the user. If, however, a category cannot be located, then the current set of key words is deemed as a long-tail key word set.

A current set of key words deemed to be a long-tail key word set is segmented into several current key word units. In some embodiments, a statically-based word segmentation algorithm is used, although any other suitable techniques may be applied.

At 39, it is determined, in the importance level table that was established, the importance levels of the segmented current key word units.

At 310, it is selected, among the current key word units, selective key word units corresponding to the importance level that satisfies a precondition. In some embodiments, the precondition is a specified threshold. In other words, the selected key word units are key word units whose importance levels meet the specified threshold. In some embodiments, the key word units are ordered according to their importance level, and the precondition specifies which ones of the key word units in the ordered sequence are selected (e.g., the first three key word units which have the highest three importance levels).

At 311, it is determined, in the search key word tables of various stages that were established, the category information corresponding to the selective current key word unit.

A number of ways to determine the category information corresponding to the selected current key word unit exist. In some embodiments, the following process is used.

Assume that the quantity of selected current key word units is S, and S is no greater than N (pre-specified number of stages). Also, assume that a preset rule requires taking the selected S current key word units, sequencing them, and combining them into stage S current key word unit groups. In the stage S search key word table, look up the category information corresponding to the stage S current key word unit groups. If the information cannot be found, the process is repeated, i.e., S-1 current key word units are selected from the S current key word units and the steps described above are re-executed. The process repeats by decrementing the number of current key word units each time until the corresponding category information is found.

If S is greater than N, then the N current key word units with the highest importance levels are selected among S current key word units. Then, after sequencing the selected N current key word units, the current key word units are combined into stage N current key word unit groups. In the stage N search key word table, the category information corresponding to said stage N current key word unit groups is looked up. If the information is not found, then N-1 current key word units are selected among the N current key words. The process is repeated for N-1, N-2, etc., until the corresponding category information is found.

For example, if the number of selected current key word units is 3, i.e., S=3, and if N=3, then the first 3 current key word units are selected and sequenced according to alphabetical or stroke order to form stage 3 current key word unit groups. Then, in the stage 3 search key word table, the category information corresponding to said stage 3 current key word unit groups is looked up. If category information is found, then it is sent from the server to the browser, which displays the category information to the user. If no category information is found, then the two current key word units with the highest importance levels are selected among the 3 current key word units. After sequencing the selected two current key word units according to alphabetical or stroke order, they are combined into stage 2 current key word unit groups. Then, in the stage 2 search key word table, the category information corresponding to said stage 2 current key word unit groups is looked up. If category information is found, then it is sent from the server to the browser, which displays the information to the user. If no category information is found, then the current key word unit having the highest importance level is selected among the two current key word units. The selected current key word unit can be regarded as a stage 1 current key word unit group. Then, the category information corresponding to the stage 1 current key word unit group in the stage 1 search key word table is looked up. The located category information is sent back to the web browser, which displays the information to the user. Since the stage 1 search key word table covers all key word units that have appeared, it is always possible to find the corresponding category information in the stage 1 search key word table.

At 312, the category information that was determined is sent. In some embodiments, the category information is sent to the user's device from the server.

In some embodiments, the non-long-tail key words in the word reference table containing correspondences between non-long-tail key words and category information may undergo word segmentation in advance. They are segmented into search key word units, and then the key word units that were segmented from each non-long-tail key word are sequenced according to alphabetical or stroke order to obtain sequenced non-long-tail key words. Then the correspondences between the sequenced non-long-tail key words and the category information are stored in the word reference table. Subsequently, after input current key words are obtained, the obtained current key words can be segmented into current key word units, which are then sequenced according to alphabetical or stroke order to produce sequenced current key words. The category information corresponding to these sequenced current key words is looked up in the reference word table. If it is not found, then the obtained current key words are confirmed as long-tail key words. Then current key word units whose importance levels satisfy a precondition are selected, and the corresponding category information is determined and provided to the user. In some embodiments, after the current key words input by the user are obtained, category information may be provided directly in accordance with the process described above, without having to look it up in a word reference table. In other words, the step of determining whether what is received is a long-tail key word or a non-long-tail key word is optional.

In the process described above, each search key word that is input during a specified period of time is segmented into search key word units; the search key word units that are segmented from each search key word are combined into search key word unit groups of various stages; the category information corresponding to the search key word unit groups that have been formed is determined; based on the category information that has been determined, search key word tables of various stages are established; the category information corresponding to the selected current key word units is determined in the established search key word tables of various stages on the basis of the current key words that were input; and the category information that was determined in this way is transmitted back. The search key word tables comprising all stages are established in advance, making it possible, based on the established search key word tables, to look up the category information corresponding to the current key word, thereby solving the problem of the prior art, namely the inability to provide the user with category information for long-tail key words. The scheme effectively increases the scope and flexibility of category information provided to users.

Figure 5:
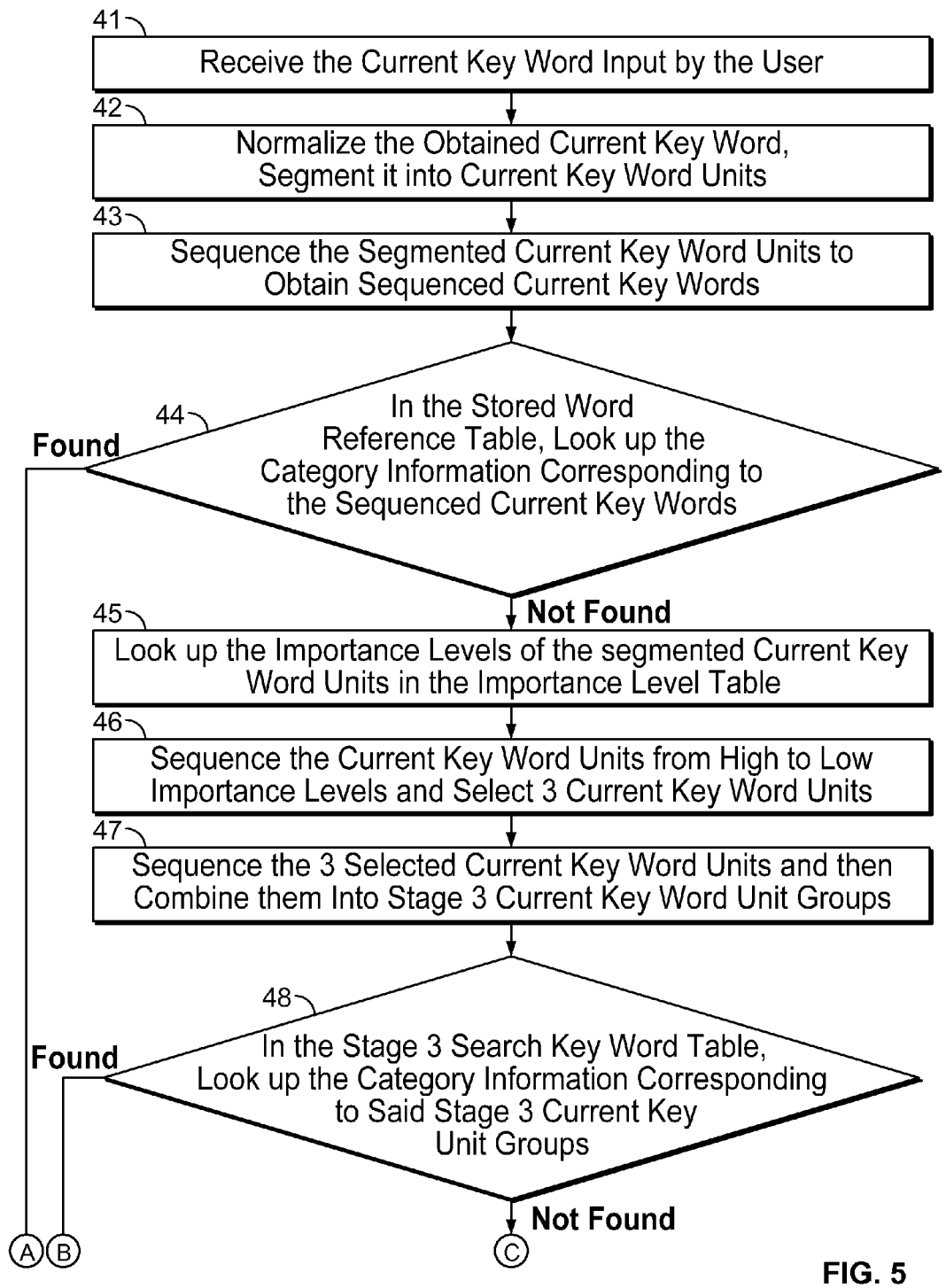
FIG. 5 is a flow chart illustrating another embodiment of a process for providing category information.
Figure 5:
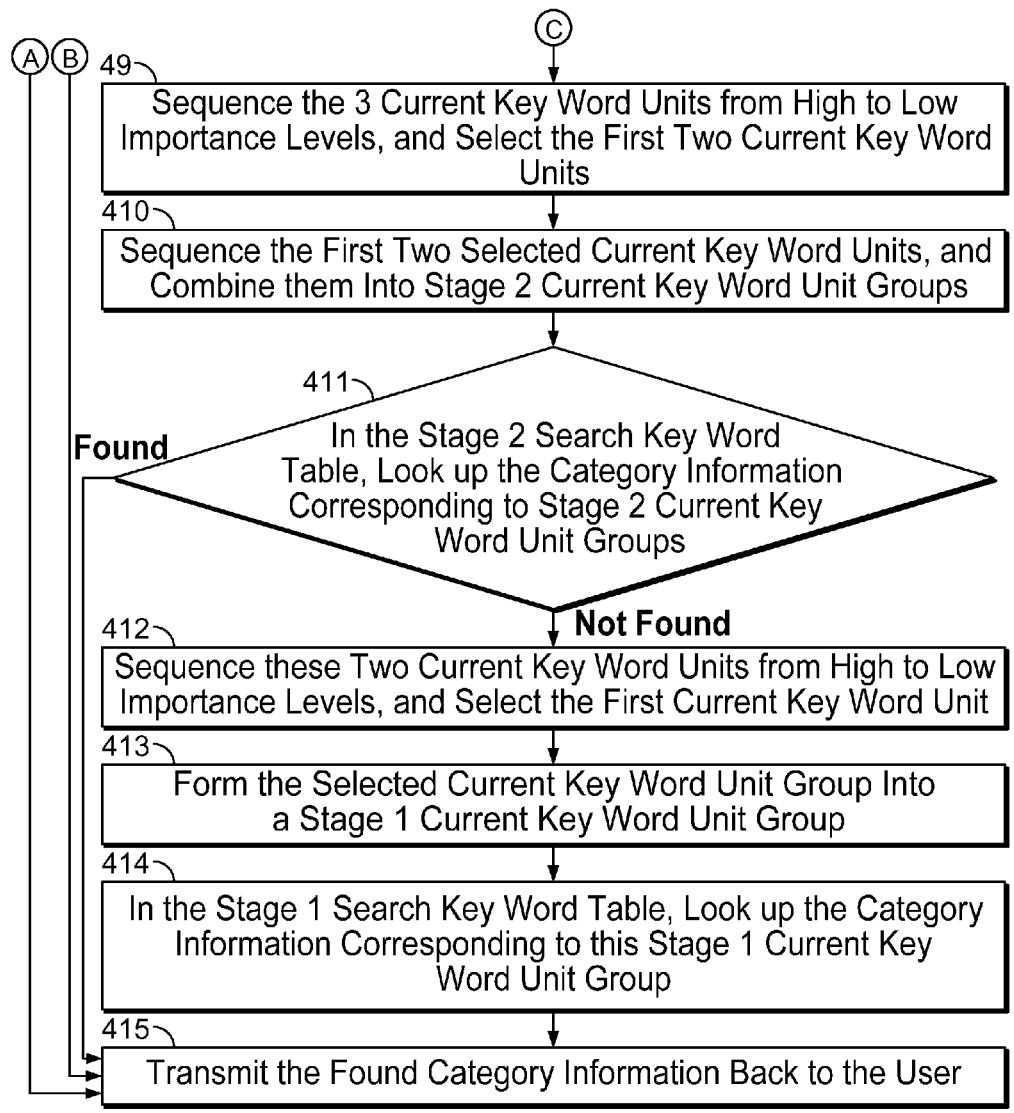

FIG. 5 is a flowchart illustrating another embodiment of a process for providing category information. The process may be performed on a system such as system 500.

At 41, the current set of key words input by the user is received.

At 42, the current set of key words is normalized and segmented into current key word units.

At 43, the segmented current key word units are sequenced according to alphabetical or stroke order to obtain sequenced current key words.

At 44, in the stored word reference table, the category information is looked up corresponding to the sequenced current key words. If the category information is found, then proceed to step 45. Otherwise, skip to step 415.

At 45, the importance levels of the segmented current key word units in the importance level table are looked up.

At 46, the current key word units are sequenced from high to low importance levels, and 3 current key word units are selected.

At 47, the 3 selected current key word units are sequenced according to alphabetical or stroke order and then combined into stage 3 current key word unit groups.

At 48, in the stage 3 search key word table, the category information corresponding to said stage 3 current key unit groups is looked up. If not found, then proceed to step 49; otherwise, skip to step 415.

At 49, the 3 current key word units are sequenced from high to low importance levels, and the first two current key word units are selected.

At 410, after the two selected current key word units are sequenced according to alphabetical or stroke order, they are combined into stage 2 current key word unit groups.

At 411, in the stage 2 search key word table, the category information corresponding to stage 2 current key word unit groups is looked up. If no category information is found, then go to step 412. Otherwise, skip to step 415.

At 412, these two current key word units are sequenced from high to low importance levels, and the first current key word unit is selected.

At 413, the selected current key word unit group is formed into a stage 1 current key word unit group.

At 414, in the stage 1 search key word table, the category information corresponding to this stage 1 current key word unit group is looked up.

At 415, the found category information is sent to the user.

Figure 6:
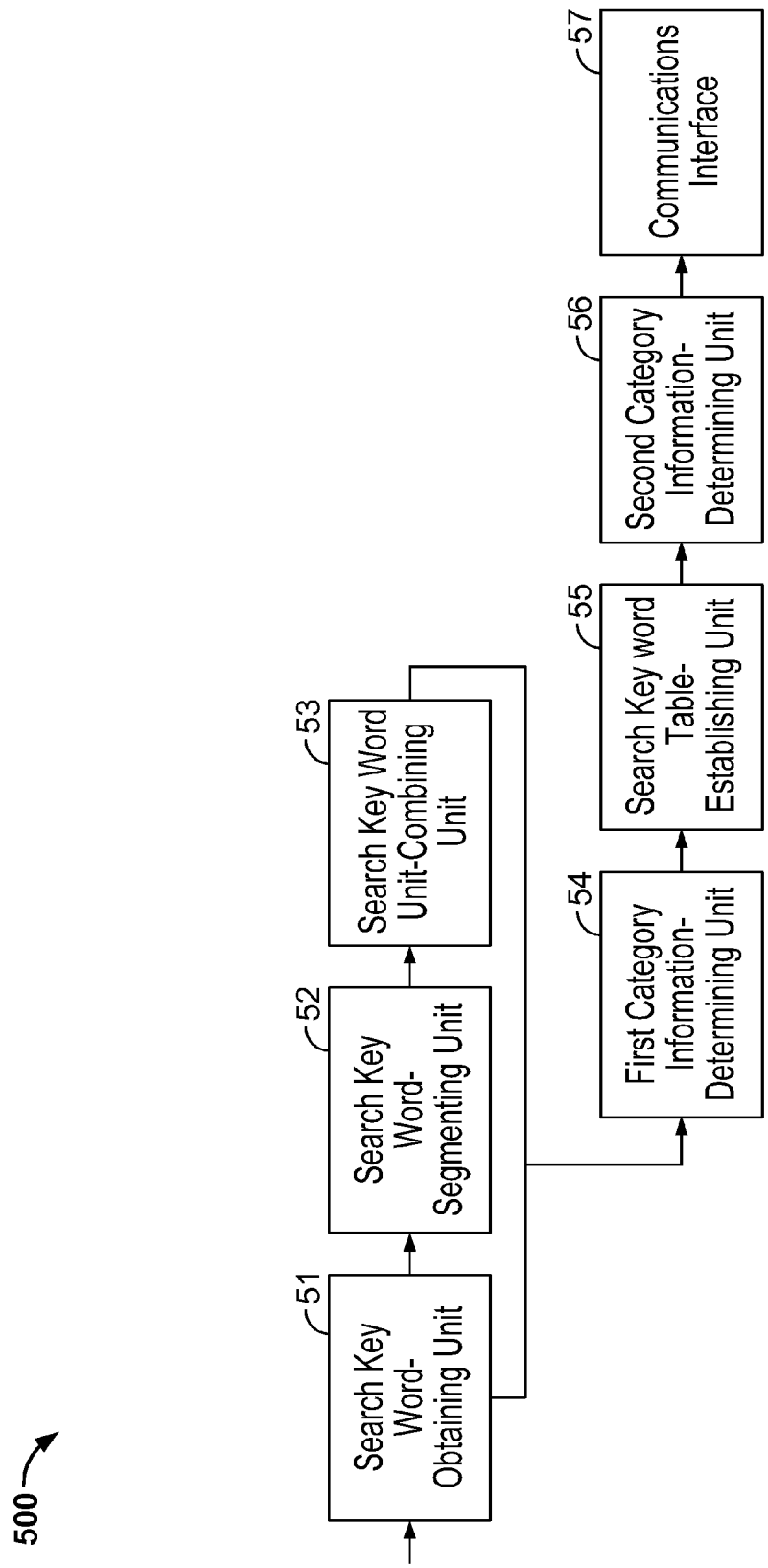
FIG. 6 is a system diagram illustrating a system for providing category information.

FIG. 6 is a system diagram illustrating a system for providing category information. System 500 comprises a search key word-obtaining unit 51, a search key word-segmenting unit 52, a search key word unit-combining unit 53, a first category information-determining unit 54, a search key word table-establishing unit 55, a second category information-determining unit 56, and a communications interface 57.

Search key word-obtaining unit 51 is configured to obtain the search key words input within a specified period of time and the category information corresponding to the search key words.

Search key word-segmenting unit 52 is configured to segment each search key word obtained by the search key word-obtaining unit 51 into search key word units.

Search key word unit-combining unit 53 is configured to combine the search key word units from each search key word, as segmented by the search key word-segmenting unit 52, into search key word unit groups of various stages.

First category information-determining unit 54 is configured to determine, based on the category information corresponding to the search key words obtained by the search key word-obtaining unit 51, the specific pieces of category information corresponding to the search key word unit groups formed by the search key word unit-combining unit 53.

Search key word table-establishing unit 55 is configured to establish, based on the category information determined by the first category information-determining unit 54, search key word tables of various stages, the search key word table of each stage containing the correspondences between the search key word unit groups of that stage with the category information.

Second category information-determining unit 56 is configured to determine, based on the input current key words, and in the search key word tables of various stages that were established by the search key word table-establishing unit 55, the category information corresponding to the selected current key word units.

Communications interface 57 is configured to return the category information determined by the second category information-determining unit 56.

Optionally, the system further comprises importance level-determining units and importance level table-establishing units. The importance level-determining unit is configured to determine the importance levels, respectively, of the segmented search key word units after the search key word tables of various stages have been established by the search key word table-establishing unit 55. The importance level table-establishing unit is configured to establish, based on the importance levels determined by the importance level-determining unit, importance level tables containing the correspondences between search key word units and importance levels.

Second category information-determining unit 56 comprises a current key word-obtaining sub-unit, a current key word-segmenting sub-unit, a first importance level-determining sub-unit, a current key word-selecting sub-unit, and a first category information-determining sub-unit. The current key word-obtaining sub-unit is configured to obtain current key words that have been input. The current key word-segmenting sub-unit is configured to segment current key words obtained by the current key word-obtaining sub-unit into current key word units. The first importance level-determining unit is configured to determine, in the importance level tables established by the importance level table-establishing unit, the importance levels of the current key word units segmented by the current key word-segmenting sub-unit. The current key word unit-selecting sub-unit is configured to select, among the current key word units segmented by the current key word-segmenting sub-unit, current key word units whose importance levels satisfy a precondition. The first category information-determining sub-unit is configured to determine, in the search key word tables of various stages that were established by the search key word table-establishing unit 55, the category information corresponding to the current key word units selected by the current key word unit-selecting sub-unit.

In some embodiments, a first category information-determining unit 54 specifically comprises a second category information-determining sub-unit and a third category information-determining sub-unit. The second category information-determining sub-unit is configured to determine, based on the category information corresponding to the search key words obtained by the search key word-obtaining unit 51, the category information corresponding to the search key words containing search key word units for each search key word unit group that was formed by the search key word unit-combining unit 53. The third category information-determining sub-unit is configured to determine the category information that was determined by the second category information-determining sub-unit and that corresponds to the search key words to be the category information corresponding to said search key word unit group.

In some embodiments, the importance level-determining unit specifically comprises a unique visitor quantity-determining sub-unit, a category entropy-determining sub-unit, and a second importance level-determining sub-unit. The unique visitor quantity-determining sub-unit, is configured to determine the quantity of unique visitors (UV) for each search key word unit under the category information. The category entropy-determining sub-unit is configured to determine, based on the UV quantity determined by the unique visitor quantity-determining sub-unit, the category entropy of each search key word unit under the various pieces of category information. The second importance level-determining sub-unit is configured to determine, based on the category entropy determined by the category entropy-determining sub-unit, the importance level of each search key word unit.

In some embodiments, the system further comprises a search key word unit-sequencing unit, a category information-looking up unit, and a second category information-returning unit. The search key word unit-sequencing unit is configured to sequence in the search key word tables of various stages that were established by the search key word table-establishing unit 55, and prior to determining the category information corresponding to the selected current key word units in accordance with a precondition, the search key word units segment from each search key word, and obtain sequenced search key word units. The category information-looking up unit is configured to look up, in a reference word table in which are stored the correspondences between non-long-tail key words and category information, category information corresponding to each sequenced search key word unit among the search key word units sequenced by the search key word unit-sequencing unit. The second category information-returning unit is configured to return found category information when found by the category information-looking up unit.

Second category information-determining unit 56 is configured to determine, in the established search key word tables of various stages, when category information is not found by the category information-looking up unit, the category information corresponding to the selected current key word units.

Figure 7:
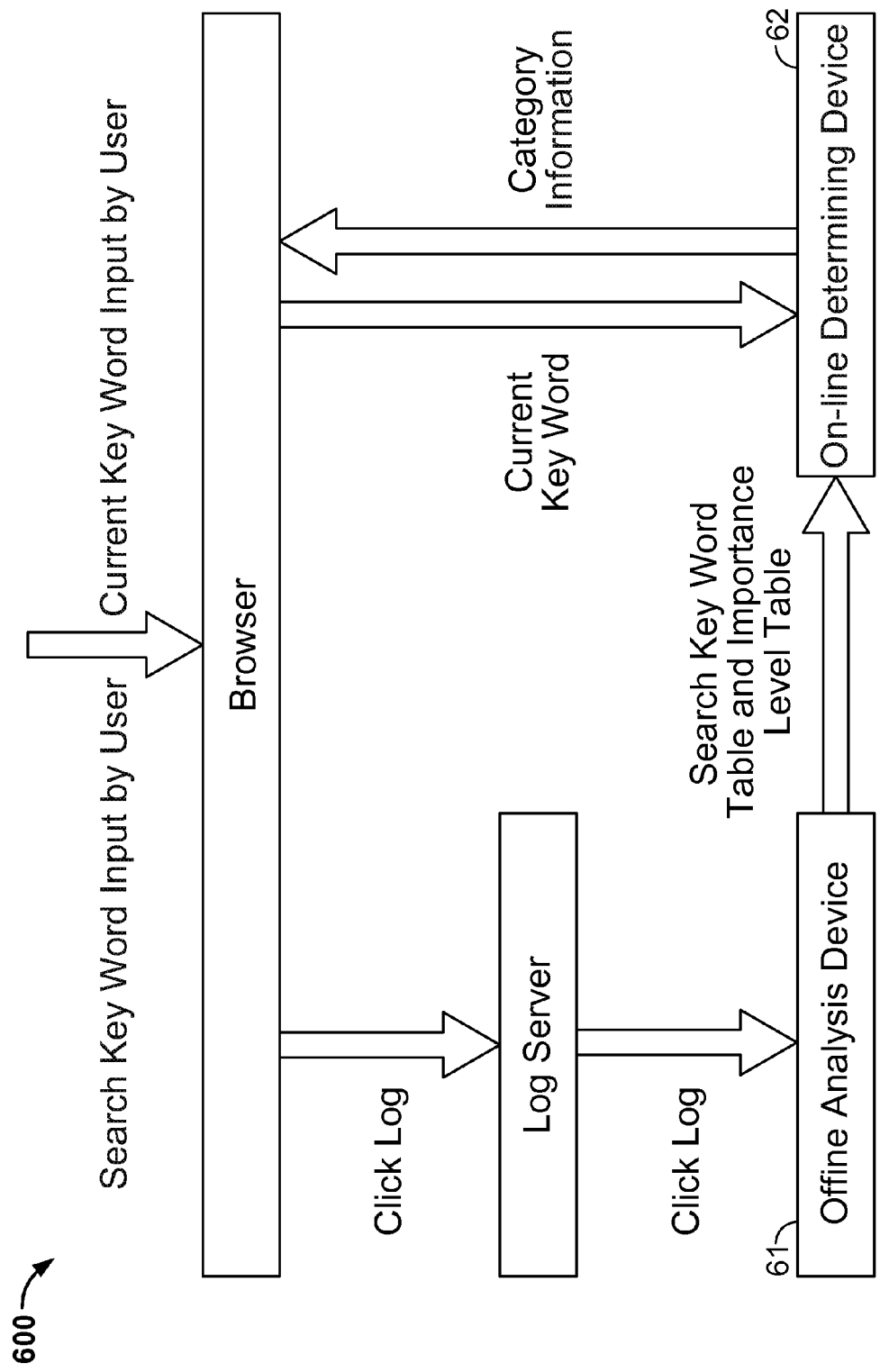
FIG. 7 is a system diagram illustrating another embodiment of a system for providing category information.

FIG. 7 is a system diagram illustrating another embodiment of a system for providing category information. In this example, system 600 includes an offline analysis device 61 and an online determining device 62. As shown in FIG. 7, after the browser obtains the search key words input by the user, it forms a selection log and then sends it to the log server. The offline analysis device 61 obtains the selection log at intervals from the log server and then establishes search key word tables of various stages and importance level tables. It then sends the established search key word tables of various stages and importance level tables to the online determining device 62. After the browser obtains the current key word, it sends it to the online determining device 62. The online determining device 62 determines the category information corresponding to said current key word on the basis of the search key word tables of various stages and importance level tables. It then sends it to the browser so as to return it to the user.

The offline analysis device 61 comprises a search key word-obtaining unit 51, a search key word-segmenting unit 52, a search key word unit-combining unit 53, a first category information-determining unit 54, a search key word table-establishing unit 55, a second category information-determining unit 56 contained by the online determining unit 62, and a communication interface 57.

In addition, the offline analysis device 61 further comprises an importance level-determining unit and an importance level table-establishing unit. The online determining device 62 further comprises a search key word unit-sequencing unit, a category information-looking up unit, and a second category information-returning unit.

Systems 500 and 600 may be implemented using one or more computing devices, such as a computer, a multi-processor system, a microprocessor-based system, a special purpose device, a distributed computing environment including any of the foregoing systems or devices, or other appropriate hardware/software/firmware combinations that include one or more processors, and memory coupled to the processors and configured to provide the processors with instructions.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

A person skilled in the art should understand that the embodiments of the present application can be provided as methods, devices (equipment), or computer software products. Therefore, the present application may make use of embodiments that are entirely hardware or software or embodiments that are combinations of hardware and software. In addition, the present application can take the form of computer programs implemented on one or more computer-operable storage media (including but not limited to magnetic disk storage devices, CD-ROMs, and optical storage devices) containing computer-operable program codes.

The present application is described with reference to flow charts and/or block diagrams based on methods, devices (equipment), and computer program products. It should be understood that each process and/or block in the flow charts and/or block diagrams, and combinations of processes and/or blocks in the flow charts and/or block diagrams can be achieved through computer program commands. One can provide these computer commands to a general-purpose computer, a specialized computer, an embedded processor or the processor of other programmable data equipment so as to give rise to a machine, with the result that the commands executed through the computer or processor of other programmable data equipment give rise to a device that is used to realize the functions designated by one or more processes in a flow chart and/or one or more blocks in a block diagram.

These computer program commands can also be stored on specially-operating computer readable storage devices that can guide computers or other programmable data equipment, with the result that the commands stored on these computer readable devices give rise to products that include command devices. These command devices realize the functions designated in one or more processes in a flow chart and/or one or more blocks in a block diagram.

These computer program commands can also be loaded onto a computer or other programmable data equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Although preferred embodiments of the present application have already been described, a person skilled in the art can make other modifications or revisions to these embodiments once he grasps the basic creative concept. Therefore, the attached claims are to be interpreted as including the preferred embodiments as well as all modifications and revisions falling within the scope of the present application. Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving a plurality of search key word sets that were previously input by a plurality of users;
obtaining category information corresponding to the plurality of search key word sets, the category information being determined based at least in part on the plurality of users' selections;
segmenting each of the plurality of search key word sets into a plurality of search key word units;
determining a plurality of importance levels of the search key word units based at least in part on determining category entropy for each of the plurality of search key word units, wherein the category entropy is determined based at least in part on a unique visitor (UV) quantity for a search key word unit in a particular category and a UV quantity for the search key word unit in all categories;
combining the search key word units into a plurality of search key word unit groups that correspond to a plurality of stages, each stage including one or more key word unit groups having the same number of search key word units, and one stage having a different number of search key word units as another stage;
based at least in part on the category information corresponding to the plurality of search key word sets and the plurality of importance levels for the search key word units, determining category information that specifically corresponds to the plurality of search key word unit groups;
based at least in part on category information specifically corresponding to the plurality of search key word unit groups, establishing a plurality of search key word tables corresponding to the plurality of stages, each stage having a corresponding search key word table that comprises the correspondence between the search key word unit groups for said each stage and the category information that specifically corresponds to the plurality of search key word unit groups;
receiving a current search key word set;
segmenting the current search key word set into current search key word units;
combining the current search key word units into a plurality of current search key word unit groups that correspond to a plurality of current stages, each current stage corresponding to a set of current search key word unit groups, each current search key word unit group in the set having the same number of current search key word units; and
using the plurality of search key word tables to identify the current category information that corresponds to the plurality of current search key word unit groups;
wherein:
the plurality of search key word tables are used to provide current category information of the current search key word set input by a user.

2. The method of claim 1, further comprising:
determining, among the plurality of search key word sets, selective search key word sets that include the search key word units of the plurality of search key word unit groups; and
providing, based on category information corresponding to the plurality of search key word sets, category information of the selective search key word sets as the category information that specifically corresponds to the plurality of search key word unit groups.

3. The method of claim 2, wherein determining the plurality of importance levels includes determining, based on recorded log information, a plurality of unique visitor (UV) quantities for the plurality of search key word units under corresponding categories.

4. The method of claim 3, wherein the determining of the category entropy for each of the plurality of search key word units is under its corresponding categories.

5. The method of claim 4, wherein the category entropy is determined by:

$$H_i = \sum_{j=1}^{K} \left( -\frac{P_{ij}}{P_i} \log_2 \frac{P_{ij}}{P_i} \right)$$

wherein, $H_i$ is the category entropy of search key word unit i;

K is the quantity of categories where UVs for the search key word unit i are present;

$P_{ij}$ is the UV quantity for the search key word unit i in the $j^{th}$ category; and $P_i$ is the UV quantity for the search key word unit i in all pieces of category information.

6. The method of claim 1, further comprising:
determining, based at least on the plurality of importance levels of the search key word units, a plurality of current importance levels of the current search key word units;
selecting among the current key word units selective current key word units whose importance levels satisfy a precondition;
determining, using the plurality of search key word tables corresponding to the plurality of stages, category information that corresponds to the selective current key word unit as the current category information.

7. The method of claim 6, wherein selecting among the current key word units selective current key word units whose importance levels satisfy a precondition that includes selecting current key word units whose importance levels meet a specified threshold.

8. The method of claim 6, wherein selecting among the current key word units selective current key word units whose importance levels satisfy a precondition that includes ordering the current key word units according to their respective importance levels and selecting a predetermined number of higher ranking current key word units as the selective current key word units.

9. The method of claim 1, wherein combing the search key word units into a plurality of search key word unit groups that correspond to a plurality of stages comprises sequencing the search key word units.

10. A system comprising: one or more hardware processors configured to:
receive a plurality of search key word sets that were previously input by a plurality of users;
obtain category information corresponding to the plurality of search key word sets, the category information being determined based at least in part on the plurality of users' selections;
segment each of the plurality of search key word sets into a plurality of search key word units;
determine a plurality of importance levels of the search key word units based at least in part on determining category entropy for each of the plurality of search key word units, wherein the category entropy is determined based at least in part on a unique visitor (UV) quantity for a search key word unit in a particular category and a UV quantity for the search key word unit in all categories;
combine the search key word units into a plurality of search key word unit groups that correspond to a plurality of stages, each stage including one or more key word unit groups having the same number of search key word units, and one stage having a different number of search key word units as another stage;
based at least in part on the category information corresponding to the plurality of search key word sets and the plurality of importance levels for the search key word units, determine category information that specifically corresponds to the plurality of search key word unit groups;
based at least in part on category information specifically corresponding to the plurality of search key word unit groups, establish a plurality of search key word tables corresponding to the plurality of stages, each stage having a corresponding search key word table that comprises the correspondence between the search key word unit groups for said each stage and the category information that specifically corresponds to the plurality of search key word unit groups;
receive a current search key word set;
segment the current search key word set into current search key word units;
combine the current search key word units into a plurality of current search key word unit groups that correspond to a plurality of current stages, each current stage corresponding to a set of current search key word unit groups, each current search key word unit group in the set having the same number of current search key word units; and
use the plurality of search key word tables to identify the current category information that corresponds to the plurality of current search key word unit groups; and
one or more memories coupled with the hardware processor, configured to provide the hardware processor with instructions;
wherein:
the plurality of search key word tables are used to provide current category information of the current search key word set input by a user.

11. The system of claim 10, wherein the one or more processors are further configured to:
determine, among the plurality of search key word sets, selective search key word sets that include the search key word units of the plurality of search key word unit groups; and
provide, based on category information corresponding to the plurality of search key word sets, category information of the selective search key word sets as the category information that specifically corresponds to the plurality of search key word unit groups.

12. The system of claim 11, wherein determining the plurality of importance levels includes determining, based on recorded log information, a plurality of unique visitor (UV) quantities for the plurality of search key word units under corresponding categories.

13. The system of claim 12, wherein the determining of the category entropy for each of the plurality of search key word units is under its corresponding categories.

14. The system of claim 13, wherein the category entropy is determined by:

$$H_i = \sum_{j=1}^{K}\left(-\frac{P_{ij}}{P_i}\log_2\frac{P_{ij}}{P_i}\right)$$

wherein, $H_i$ is the category entropy of search key word unit i;

K is the quantity of categories where UVs for the search key word unit i are present;

$P_{ij}$ is the UV quantity for the search key word unit i in the $j^{th}$ category; and $P_i$ is the UV quantity for the search key word unit i in all pieces of category information.

15. The system of claim 10, wherein the one or more processors are further configured to:
   determine, based at least on the plurality of importance levels of the search key word units, a plurality of current importance levels of the current search key word units;
   select among the current key word units selective current key word units whose importance levels satisfy a precondition;
   determine, using the plurality of search key word tables corresponding to the plurality of stages, category information that corresponds to the selective current key word unit as the current category information.

16. The system of claim 15, wherein selecting among the current key word units selective current key word units whose importance levels satisfy a precondition that includes selecting current key word units whose importance levels meet a specified threshold.

17. The system of claim 15, wherein selecting among the current key word units selective current key word units whose importance levels satisfy a precondition that includes ordering the current key word units according to their respective importance levels and selecting a predetermined number of higher ranking current key word units as the selective current key word units.

18. A computer program product for determining category information, the computer program product being embodied in a tangible non-transitory computer readable storage medium and comprising computer instructions for:
   receiving a plurality of search key word sets that were previously input by a plurality of users;
   obtaining category information corresponding to the plurality of search key word sets, the category information being determined based at least in part on the plurality of users' selections;
   segmenting each of the plurality of search key word sets into a plurality of search key word units;
   determining a plurality of importance levels of the search key word units based at least in part on determining category entropy for each of the plurality of search key word units, wherein the category entropy is determined based at least in part on a unique visitor (UV) quantity for a search key word unit in a particular category and a UV quantity for the search key word unit in all categories;
   combining the search key word units into a plurality of search key word unit groups that correspond to a plurality of stages, each stage including one or more key word unit groups having the same number of search key word units, and one stage having a different number of search key word units as another stage;
   based at least in part on the category information corresponding to the plurality of search key word sets and the plurality of importance levels for the search key word units, determining category information that specifically corresponds to the plurality of search key word unit groups;
   based at least in part on category information specifically corresponding to the plurality of search key word unit groups, establishing a plurality of search key word tables corresponding to the plurality of stages, each stage having a corresponding search key word table that comprises the correspondence between the search key word unit groups for said each stage and the category information that specifically corresponds to the plurality of search key word unit groups;
   receiving a current search key word set;
   segmenting the current search key word set into current search key word units:
   combining the current search key word units into a plurality of current search key word unit groups that correspond to a plurality of current stages, each current stage corresponding to a set of current search key word unit groups, each current search key word unit group in the set having the same number of current search key word units; and
   using the plurality of search key word tables to identify the current category information that corresponds to the plurality of current search key word unit groups;
   wherein:
   the plurality of search key word tables are used to provide current category information of the current search key word set input by a user.

\* \* \* \* \*

UNITED STATES PATENT AND TRADEMARK OFFICE
CERTIFICATE OF CORRECTION

PATENT NO.       : 9,087,108 B2
APPLICATION NO.  : 14/037247
DATED            : July 21, 2015
INVENTOR(S)      : Jianping Qian Page 1 of 1

It is certified that error appears in the above-identified patent and that said Letters Patent is hereby corrected as shown below:

Title page drawing, reference block 61, delete "Offine Analysis Device" and insert -- Offline Analysis Device -- therefor.
In the Drawings
In Sheet 8, FIG. 7, reference block 61, delete "Offine Analysis Device" and insert -- Offline Analysis Device -- therefor.
In the Claims
In Claim 18, Column 20, Line 32, after "key word units", delete ":" and insert -- ; -- therefor.

Signed and Sealed this
Fifth Day of July, 2016

Michelle K. Lee
*Director of the United States Patent and Trademark Office*